United States Patent [19]

Eilenstein-Wiegmann et al.

[11] Patent Number: 5,316,242
[45] Date of Patent: May 31, 1994

[54] APPARATUS FOR GUIDING DIFFERENT SIZE PALLETS, ESPECIALLY ON THE LOADING FLOOR OF AN AIRCRAFT

[75] Inventors: Wilfried Eilenstein-Wiegmann, Stuhr; Guenter Vogg, Bremen, both of Fed. Rep. of Germany

[73] Assignee: Deutsche Aerospace Airbus GmbH, Hamburg, Fed. Rep. of Germany

[21] Appl. No.: 39,809

[22] Filed: Mar. 29, 1993

[30] Foreign Application Priority Data

Apr. 1, 1992 [DE] Fed. Rep. of Germany ....... 4210702

[51] Int. Cl.⁵ ............................ B63B 25/22; B64C 1/20
[52] U.S. Cl. ............................ 244/137.1; 244/118.1; 410/69; 410/107; 410/111
[58] Field of Search ......................... 244/118.1, 137.1; 410/69, 79, 80, 95, 107, 111

[56] References Cited

U.S. PATENT DOCUMENTS

| | | | |
|---|---|---|---|
| 3,778,012 | 12/1973 | Fernandez | 410/69 |
| 3,933,101 | 1/1976 | Blas | 410/69 |
| 4,234,278 | 11/1980 | Harshman | 244/118.1 |
| 4,415,298 | 11/1983 | Voight | 410/69 |
| 4,457,649 | 7/1984 | Vogg et al. | 244/137.1 |
| 4,696,609 | 9/1987 | Cole | 244/137.1 |
| 5,234,297 | 8/1993 | Wieck et al. | 244/118.1 |

FOREIGN PATENT DOCUMENTS 2374249 8/1978 France .................................. 410/79

Primary Examiner—Michael S. Huppert
Assistant Examiner—Virna Lissi Ansley
Attorney, Agent, or Firm—W. G. Fasse; W. F. Fasse

[57] ABSTRACT

A guiding mechanism for loads on the loading floor of an aircraft has two separate guide elements tiltably mounted in a support frame. The frame with its guide elements is arranged so that the longitudinal frame axis extends substantially perpendicularly to the freight moving direction on the loading floor. Each guide element is equipped with guide rollers for guiding a vertical edge of a pallet and with a latching hook for guiding a horizontal edge of a pallet. The guide hooks prevent a tilting of a pallet. The guide elements are journalled in the frame, so that one of the guide elements is tiltable into the frame with its guide surface facing downwardly, while the other guide element is tiltable into the frame so that its guide surface faces substantially upwardly. Further, one of the two guide elements is equipped with a roll-over bail which tilts the respective guide element into the frame when a load rolls over the bail. Thus, a large pallet moves one of the guide elements out of the way, whereby the large pallet is guided by the other guide element.

12 Claims, 2 Drawing Sheets

APPARATUS FOR GUIDING DIFFERENT SIZE PALLETS, ESPECIALLY ON THE LOADING FLOOR OF AN AIRCRAFT

FIELD OF THE INVENTION

The invention relates to an apparatus for guiding different pallets or freight containers on the loading floor of an aircraft, wherein two guide elements are provided, one of which becomes effective for a small pallet size, and the other becomes effective for another larger pallet size which moves the one guide element out of the way.

BACKGROUND INFORMATION

Such devices are installed particularly in parallel to the inward movement direction of a pallet or the like on the loading floor of an aircraft in the area next to the loading gate. These devices assure a defined loading movement of loads carrying pallets or containers in the cargo hold of an aircraft. In order to assure a proper guiding even if pallets or freight containers of different sizes are being loaded, it is known to arrange suitable guide elements in the area of the loading floor. It is also possible to use a plurality of guide elements next to each other or one behind the other and to use that set of guiding elements which is suitable for a particular load size. The other set of guide elements is then either recessed in the loading floor or altogether removed for the time being.

The just described operation is undesirable because it requires substantial man-hours. Besides, there is the problem that the guide elements cannot be spaced from one another with a sufficiently small spacing between two neighboring guide elements. Thus, the available loading space or loading area may not be used most efficiently. However, the just mentioned considerations have a substantial influence on achieving minimal loading and unloading times, as well as reducing freight costs.

OBJECTS OF THE INVENTION

In view of the foregoing it is the aim of the invention to achieve the following objects singly or in combination:

to construct a guide mechanism of the type described above in such a manner that pieces of freight, especially pallets of different sizes, can be guided on the loading floor of an aircraft, whereby the required different guide elements are arranged next to one another with a small spacing;

to assure that one of two guide elements is easily recessed into the loading floor when it is not needed during handling of large pallets or the like;

to facilitate the handling of large pallets as well as small pallets on the loading floor of an aircraft with equal efficiency; and to make sure that two closely spaced guide elements do not interfere with each other, whereby one guide element is constructed for guiding a small pallet, while the other guide element is constructed for guiding a large pallet.

SUMMARY OF THE INVENTION

The load guiding mechanism according to the invention is characterized by two separate guide elements tiltably mounted in a support frame. The frame with its guide elements is arranged preferably with its longitudinal frame axis extending substantially perpendicularly to the freight moving direction. Each guide element is equipped with guide rollers for guiding a vertical edge of a pallet and with a latching hook for guiding a horizontal edge of a pallet. The guide hooks prevent a tilting of a pallet. The guide elements are journalled in the frame, so that one of the elements is tiltable into the frame so that its guide surface faces substantially downwardly, while the other guide element is tiltable into the frame so that its guide surface faces substantially upwardly. Further, one of the two guide elements is equipped with a roll-over bail which tilts the respective guide element into the frame when a load rolls over the bail. Thus, a large pallet moves one of the guide elements out of the way, whereby the large pallet is guided by the other guide element. The frame preferably mounts both elements in common.

According to the invention the two guide elements are arranged in a row so that pallets of different sizes can be exactly guided, either by one or the other of the two guide elements. In the following text the guide elements will be referred to as first guide element and second guide element. The first guide element is the one equipped with the roll-over bail and guides smaller pallets. The spacing between the two guide elements is selected in accordance with the different sizes of the pallets. As mentioned, the latching hooks make sure that a pallet cannot tilt, whereby the pallets are prevented from lifting off the loading floor. A relative displacement between a pallet and its load is also prevented. The first guide element is constructed for guiding a small pallet. The second guide element guides a larger pallet, whereby the larger pallet automatically rolls onto the roll-over bail of the first guide element, thereby tilting the first guide element out of the way into the frame below the level of the loading floor. Since the guiding surface of the first guide element in its recessed position faces substantially downwardly, it is out of the way of the second guide element. Thus, the tilting of the first guide element out of the way does not hinder at all the function of the second guide element for guiding a larger pallet. Similarly, since the second guide element tilts in the opposite direction so that its guide surface in the recessed position faces substantially upwardly, such tilting also does not interfere with the proper operation of the first guide element. As a result, it is possible to optimally space the two guide elements with a small spacing from each other, preferably in the same support frame.

Guide rollers are provided for contacting vertical edges of a pallet. Thus, frictional forces are minimized and pallets are guided without substantial forces being involved. As a result, a heavy construction especially for the guide elements is avoided and the corresponding journal bearings can be correspondingly of a light construction.

The override bail of the first guide element is so constructed that it has a main section extending in the direction of travel of a load and two lead-on sections extending at an angle to the main section in such a way that a load can fold the first guide element into its recessed position by rolling over the bail in a forward or in a backward direction. Preferably, the override sections extend at an angle of about 45° to the extension of the main section of the override bail.

The override sections of the bail are further so inclined that they form a ramp on which a pallet can slide for recessing the first guide element.

Preferably, the frame structure to which the guide elements are journalled is constructed as a unitary carrier frame in which the respective journal shafts are mounted.

An easy installation in all types of loading floors with standardized support rails in the loading floor, is assured by providing the frame structure with means for securing the frame structure to such standardized support rails in the loading floor.

The above mentioned guide rollers should preferably be so arranged that each guide element carries at least two guide rollers having a vertical rotational axis. If desired, the latching hooks could also be provided with one or more guide rollers, whereby these guide rollers would have a horizontal or near horizontal rotational axis.

According to the invention, it is also preferable that the second guide element can be operated manually or by foot through a latch pawl, whereby the second guide element can also be rolled over by a load when the second guide element is recessed in the floor, and whereby the second guide element is safely fixed in its upright working position when the latch pawl is not operated. For this purpose, the latch pawl is equipped with a latching projection engaging a latching shoulder of the second guide element. Preferably, the latch pawl is also mounted on its own journal shaft for a pivoting movement in response to operation of the pawl, for example, manually or by foot.

At least one of the first and second guide elements should be spring biased so that the respective guide element is held by the spring, either in the recessed position or in the upright operating position.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
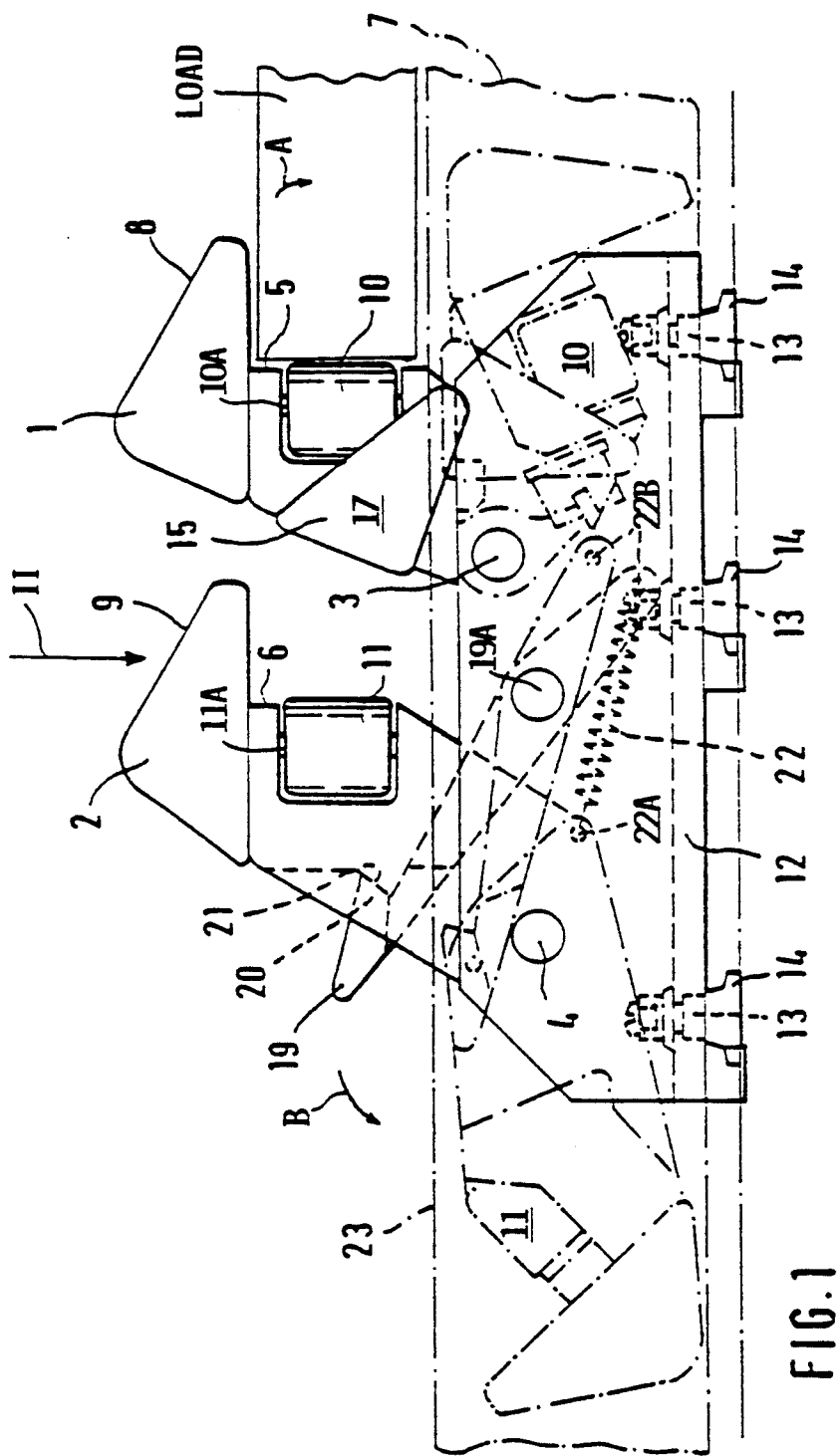
FIG. 1 is a side view of a guide mechanism according to the invention, whereby full lines illustrate the upright operative position of the guide elements while dash-dotted lines illustrate the recessed position of these guide elements.
Figure 2:
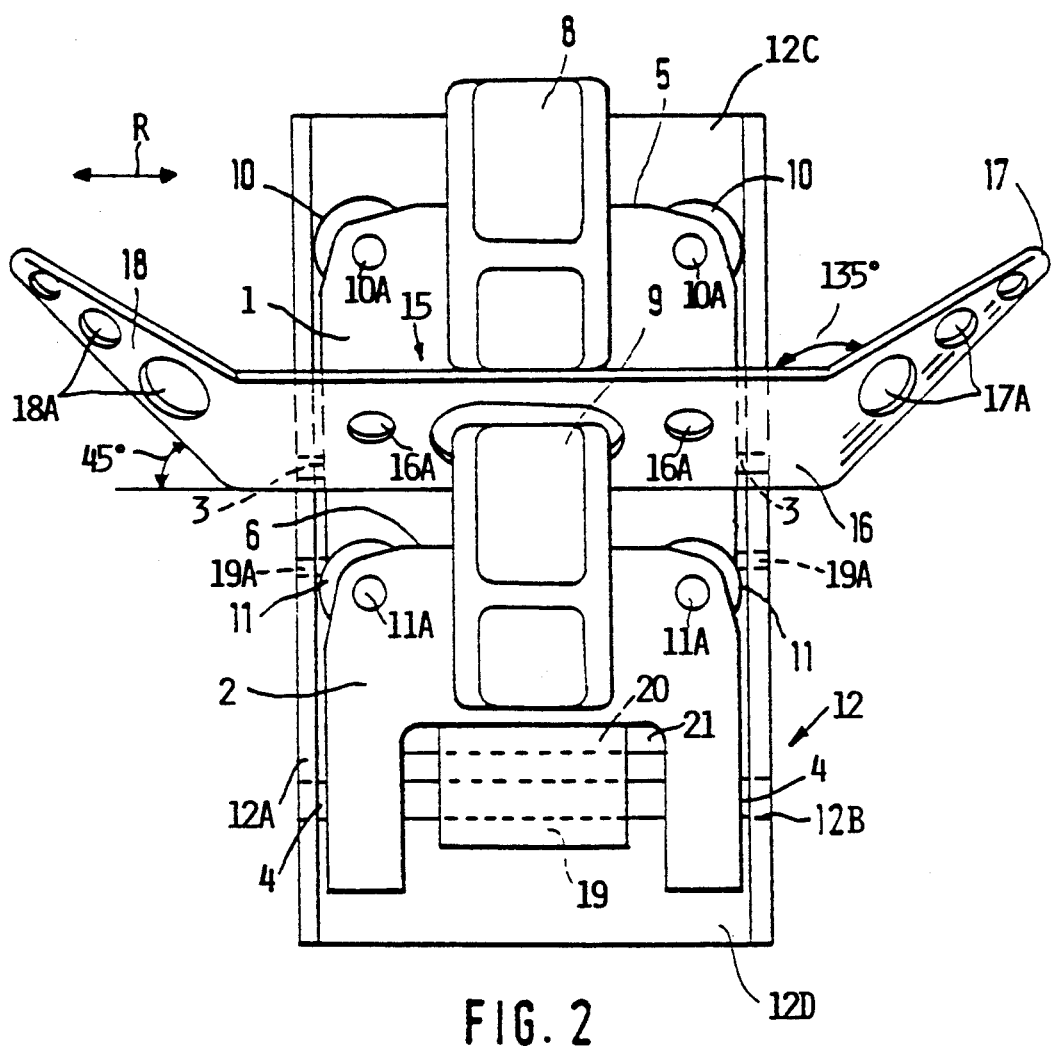
FIG. 2 is a top plan view in the direction of the arrow II in FIG. 1 onto the present apparatus.

In FIG. 1 the rolling direction of a piece of freight is perpendicular to the plane defined by the drawing sheet that is, in parallel to the guide surfaces of the present guide elements 1 and 2. In FIG. 2 the rolling direction is indicated by a double arrow R. Referring to both figures in conjunction, the guide element 1 is referred to as the first guide element and the guide element 2 is the second guide element. Both guide elements 1 and 2 are mounted on journal shafts 3 and 4 respectively in a frame structure 12 that is preferably provided for both guide elements in common. The first guide element 1 has a guide surface 5, whereby guide rollers 10 in their operating position extend with their journal axis 10A vertically so that the roller surface extends substantially in parallel to the guide surface 5 for contacting a vertical edge of a pallet or the like. Similarly, guide rollers 11 with their journal axis 11A are arranged in the second guide element 2. For recessing the first guide element 1 with its latch hook 8, the entire unit is tiltable clockwise as indicated by the arrow A in FIG. 1 to assume the recessed position shown in dash-dotted lines in FIG. 1. On the other hand, the second guide element 2 with its latch hook 9, is tiltable counterclockwise as indicated by the arrow B to assume the dash-dotted recessed position shown in the left-hand portion of FIG. 1. Thus, the rollers 10 in the recessed position face substantially downwardly, while the rollers 11 in the recessed position face substantially upwardly.

The latch hooks 8 and 9 in their operating position reach over a horizontal edge of a pallet or container, thereby preventing any tilting or lifting of the pallet in the vertical direction. Additional rollers that face downwardly in the operating position may be provided in the hooks 8 and 9. The rollers reduce frictional forces between a load and the guide elements.

FIG. 2 shows the frame structure 12 having two side walls 12A and 12B and two end walls 12C and 12D. The journal shaft 3 extends into the side walls 12A and 12B to support the first guide element 1 with its override bail 15 rigidly secured to a back portion of the guide element 1. A journal shaft 19A supports a latch pawl 19 in the frame 12 and the above mentioned journal shaft 4 supports the second guide element 2 in the frame 12. Preferably, the frame 12 with its side walls 12A and 12B and its end walls 12C and 12D is a unitary structure provided in common for both guide elements 1 and 2.

Referring again to FIG. 1, the frame structure 12 is secured to the loading floor 7 of an aircraft by means of mounting elements 13, such as nuts and bolts extending into support rails 14 forming part of the loading floor structure. The frame 12 extends crosswise relative to the length of the support rails 14.

The first guide element 1 is equipped with the above roll-over or override bail 15 which has a central section 16 rigidly secured to the back of the first guide element 1, and two roll-over side sections 17 and 18. The roll-over bail 15 is preferably provided with through-holes 16A, 17A, and 18A for weight reduction. As shown in FIG. 2, the roll-over side sections 17 and 18 extend at an angle of about 45° relative to the central section 16. Additionally, the override bail 15 is inclined relative to the vertical just as the back of the first guide element 1. The side sections 17 and 18 are correspondingly inclined and extend downwardly into the frame 12 when the recessed position is assumed by the guide element 1. Generally, the just described inclinations are so selected that the roll-over of a pallet or the like onto the bail 15 is facilitated for easily bringing the guide element 1 into its recessed position. This recessing is accomplished by a pallet of a size large enough so that its edges will be guided by the guide surfaces 6 and the guide rollers 11 of the second guide element 2 rather than being guided by the first guide element 1.

As best seen in FIG. 1, the second guide element 2 cooperates with a latch pawl 19 that normally tends to hold the second guide element 2 in its upright operating position by a latching projection 20 cooperating with a latching shoulder 21 on the back of the second guide element 2. The latching pawl 19 is journalled on its journal shaft 19A and connected with its right-hand end 22B to a biasing spring 22, which is connected with its left-hand end 22A to the body of the second guide element 2. The biasing spring 22 biases the latching pawl 19 and the guide element 2 relative to each other in such a way that the engagement of the latching projection 20 with the latching shoulder 21 is normally maintained in the absence of a downwardly directed force on the left-hand end of the pawl 19 for maintaining the upright full-line position of the latching element 2 as shown in FIG. 1. When a downward force is applied to the pawl 19, the guide element 2 will automatically tilt counterclockwise as indicated by the arrow B around its journal shaft 4 to bring the second guide element 2 into its recessed position including the pawl 19. As seen in FIG. 1, the shaft 4 also forms a stop for the pawl 19 in its recessed position.

In operation, a small sized pallet will be guided by the first guide element 1 with its guide surface 5, its guide roller 10, and its latching hook 8. On the other hand, a larger pallet will automatically bring the first guide element 1 into its recessed position by rolling over the bail 15, thereby recessing the first guide element 1 into the loading floor 7, whereby the first guide element 1 can be completely rolled over.

The larger pallet is now guided by the guide surface 6, the guide rollers 11, and the downwardly facing surface of the latching hook 9 of the second guide element 2. However, if it is desired to also move the second guide element 2 out of the way by recessing it below the floor level 23 of the loading floor 7, a manual operation or operation by foot of the latch pawl 19 permits such recessing by disengaging the projection 20 from the shoulder 21. Once both guide elements 1 and 2 are recessed into the floor 7 below the floor level 23, free movement in all directions of the pallets or containers is possible.

Although the invention has been described with reference to specific example embodiments it will be appreciated that it is intended to cover all modifications and equivalents within the scope of the appended claims.

What we claim is:

1. A mechanism for guiding a load on the loading floor of an aircraft comprising a pair of two separate guide elements, means for tiltably mounting both guide elements in said loading floor, whereby said two guide elements are arranged in a row having a longitudinal row axis extending substantially perpendicularly to a freight moving direction (R) on the loading floor, each guide element comprising guide roller means for guiding a vertical edge of a load pallet and with a latching hook for guiding a horizontal edge of a load pallet for preventing a tilting of a load pallet, said mounting means for said guide elements comprising journal bearings arranged so that one of the guide elements is tiltable into said loading floor with respective guide roller means facing substantially downwardly, while the other guide element is tiltable into the loading floor so that respective guide roller means face substantially upwardly, one of the two guide elements comprising a roll-over bail which tilts the respective guide element into said loading floor in response to a load rolling over said roll-over bail, whereby a large pallet moves one of the guide elements out of the way for the large pallet to be guided by the other guide element.

2. The mechanism of claim 1, wherein said roll-over bail (15) comprises a central bail section defining a plane extending substantially in said freight moving direction (R), and two laterally angled roll-over bail sections (17, 18) extending away from said central bail section for being contacted by a load to recess the respective guide element (1).

3. The mechanism of claim 2, wherein the angled lateral bail sections (17, 18) extend at an angle of about 45° relative to said central bail section (16) of said roll-over bail (15).

4. The mechanism of claim 2, wherein said angled lateral bail sections of said roll-over bail are angled toward a guide surface of the respective bail, and additionally are angled at a slant downwardly to facilitate the rolling over by a load.

5. The mechanism of claim 1, wherein said means for mounting comprise a common support frame for said two separate guide elements and journal bearing shafts in said common support frame for individually supporting said guide elements in a tiltable manner in said common support frame.

6. The mechanism of claim 5, wherein said support frame comprises mounting means for securing said support frame to support rails mounted in said loading floor of an aircraft.

7. The mechanism of claim 1, wherein each of said guide elements comprises at least two guide rollers (10, 11).

8. The mechanism of claim 1, wherein one of said guide elements is a first guide element for guiding a smaller load, and the other of said guide elements is a second guide element for guiding a larger load, said second guide element comprising a latching pawl (19) having a latching projection (20) cooperating with a latching shoulder (21) of said second guide element (2) for normally holding said second guide element in an upright, operative position.

9. The mechanism of claim 8, further comprising a journal bearing (19A) for said latching pawl (19) for mounting said latching pawl (19) in a tiltable manner.

10. The mechanism of claim 9, further comprising a biasing spring (22) interconnecting said second guide element with said latching pawl (19).

11. The mechanism of claim 1, further comprising a biasing spring for biasing at least one of said guide elements in at least one of two possible positions.

12. The mechanism of claim 1, wherein one of said guide elements is journalled for tilting clockwise into a recessed position while the other guide element is journalled for tilting counterclockwise into a recessed position.

* * * * *